(12) United States Patent
Zamer

(10) Patent No.: US 10,699,314 B2
(45) Date of Patent: *Jun. 30, 2020

(54) ANALYZING USER-PREFERRED CHARACTERISTICS AMONG MERCHANTS

(71) Applicant: PAYPAL, INC., San Jose, CA (US)

(72) Inventor: Kamal Zamer, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,741

(22) Filed: Sep. 17, 2019

(65) Prior Publication Data
US 2020/0020005 A1     Jan. 16, 2020

Related U.S. Application Data

(63) Continuation of application No. 16/127,142, filed on Sep. 10, 2018, now Pat. No. 10,417,678, which is a continuation of application No. 15/584,863, filed on May 2, 2017, now Pat. No. 10,074,119, which is a continuation of application No. 14/666,217, filed on Mar. 23, 2015, now Pat. No. 9,639,873.

(51) Int. Cl.
*G06Q 30/06* (2012.01)

(52) U.S. Cl.
CPC ..... *G06Q 30/0605* (2013.01); *G06Q 30/0625* (2013.01); *G06Q 30/0631* (2013.01)

(58) Field of Classification Search
CPC .................................................. G06Q 30/065
USPC ................................. 235/380; 705/14.58, 35
See application file for complete search history.

(56) References Cited

U.S. PATENT DOCUMENTS

| | | |
|---|---|---|
| 2006/0122921 A1 | 6/2006 | Comerford et al. |
| 2014/0067799 A1 | 3/2014 | Zolfo et al. |
| 2014/0304075 A1 | 10/2014 | Dillingham et al. |
| 2014/0358897 A1 | 12/2014 | Mishra et al. |
| 2014/0372219 A1 | 12/2014 | Hart et al. |
| 2015/0095190 A1 | 4/2015 | Hammad et al. |
| 2015/0100405 A1 | 4/2015 | Lee |
| 2015/0120408 A1 | 4/2015 | Liu et al. |
| 2015/0134507 A1 | 5/2015 | Lucas et al. |

*Primary Examiner* — Allyson N Trail
(74) *Attorney, Agent, or Firm* — Haynes and Boone LLP

(57) ABSTRACT

A system or method is provided to analyze and determine distinguishing or secondary characteristics among merchants. In particular, the system may collect basic merchant information, such as name, type of business, products/services offered, location, owner, and other basic information regarding merchants. The system may determine merchants that are similar in type, size, location, of other factors, based on the basic information. They system may then determine distinguishing or secondary characteristics among similar merchants. The distinguishing or secondary characteristics may be determined from consumers' transactions with the merchants or other data detected by sensors or devices.

20 Claims, 4 Drawing Sheets

ANALYZING USER-PREFERRED CHARACTERISTICS AMONG MERCHANTS

CROSS REFERENCED TO RELATED APPLICATIONS

This application is a continuation of U.S. patent application Ser. No. 16/127,142, filed Sep. 10, 2018, which is a continuation of U.S. patent application Ser. No. 15/584,863, filed May 2, 2017, now U.S. Pat. No. 10,074,119 which is a continuation of U.S. patent application Ser. No. 14/666,217, filed Mar. 23, 2015, now U.S. Pat. No. 9,639,873, all of which are incorporated herein by reference in their entirety.

BACKGROUND

Field of the Invention

The present invention generally relates to systems and methods for analyzing and leveraging distinguishing characteristics among merchants.

Related Art

Consumers have many choices of merchants from whom to purchase various types of products or services. However, the number of choices may be overwhelming for consumers when selecting a merchant to purchase products or services from. For example, multiple gas stations may be located in close proximity to each other. Consumers may have difficulty figuring out the differences, if any, between the multiple gas stations, besides the posted gas prices. Thus, there is a need for a system or method that analyzes and determines distinguishing characteristics among merchants specific to user preferences.

Figure 1:
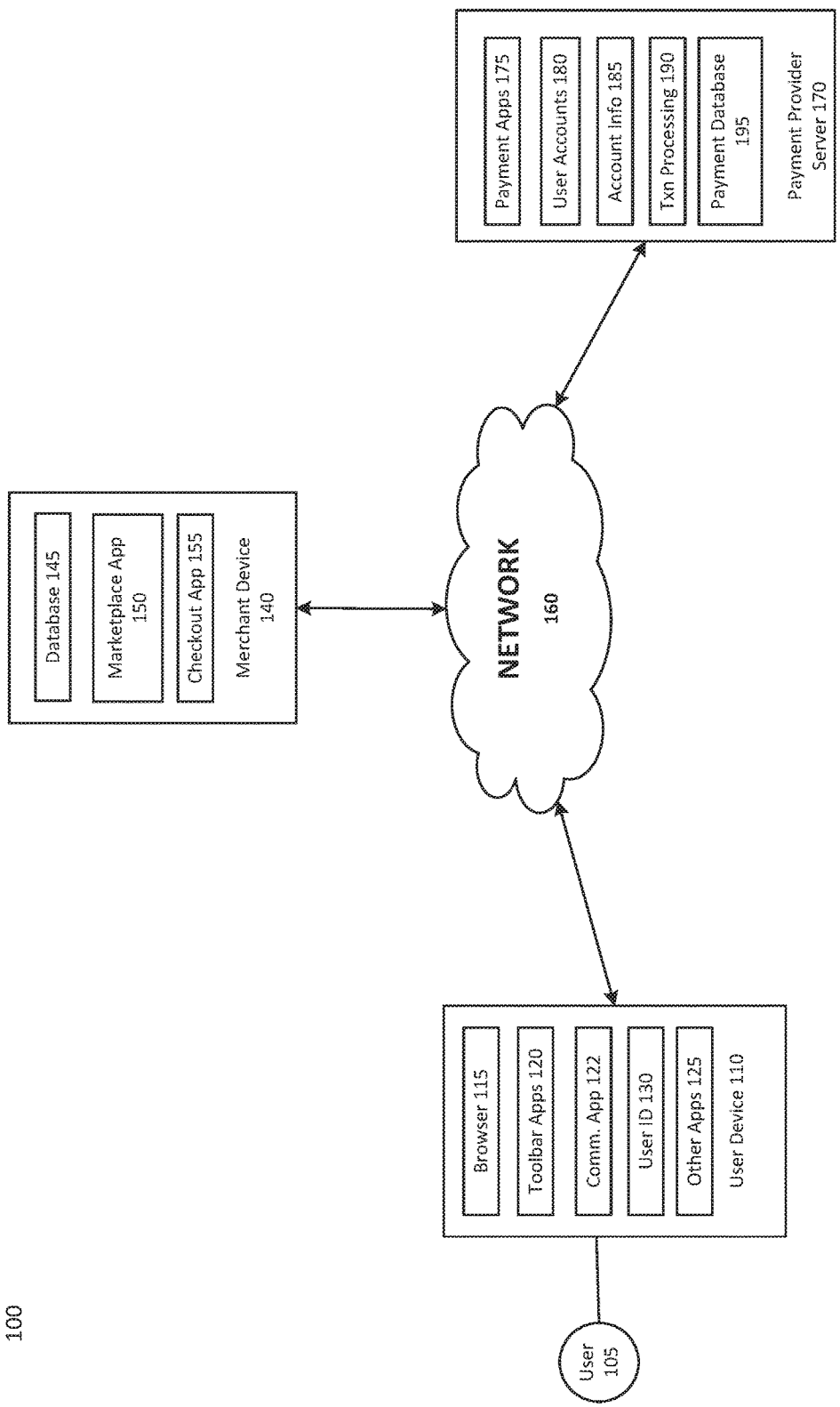
FIG. 1 is a block diagram of a networked system suitable for analyzing and leveraging distinguishing characteristics among merchants according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method is provided to analyze and determine distinguishing characteristics among merchants. In particular, the system may collect basic merchant information, such as name, type of business, products/services offered, location, owner, and other basic information regarding merchants. The system may determine merchants that are similar in type, size, location, of other factors, based on the basic information. They system may then determine distinguishing characteristics among similar merchants. The distinguishing characteristics may be determined from consumers' transactions with the merchants or other data detected by sensors or devices. Such characteristics may be used to determine which merchant may be recommended to a particular consumer, based in part on what the consumer may want from the merchant, including non-primary purposes, purchases, or services.

In an embodiment, the system may determine peripheral or additional services or products provided by merchants as distinguishing characteristics. For example, three gas stations may be located at the same intersection. The system may determine distinguishing characteristics based on user factors and effects on the user factors after users visited the gas stations. In an example, all three gas stations may offer pressurized air for car tires. However, only one of the three gas stations offers free pressurized air. This can be determined based on the purchase or transaction data of consumers who visited the gas stations. For example, the consumers' devices may detect that their tire pressure sensors indicate increase in tire air pressure, but the consumers are not charged for pressurized air. This indicates that the gas station provides free pressurized air. Other data may be used, such as postings on social networks and review sites and/or information from a merchant site or provided by the merchant.

In an embodiment, the system may determine included or nearby amenities as distinguishing characteristics. For example, one of the three gas stations may be located next to a restaurant, such that customers may visit the restaurant immediately before or after getting gas at the gas station. This distinguishing characteristic may be determined based on public mapping data, review sites, and/or by monitoring the user's activities (including purchases at the restaurant) and movement. For example, the user's mobile device may detect that the user walks from the gas station to the restaurant on foot without driving. As such, having a location immediately next to a restaurant may be a distinguishing characteristic of the gas station.

In an embodiment, the system may determine a user's preferences or goals, such as health goals or budget goals. The user's preferences or goals may be determined based on the user's input or activities or transactions performed by the user. For example, the user may have a health goal of losing weight or a budget goal of saving up for a vacation. The system may recommend merchants based on the merchants' distinguishing characteristics and the user's goals or preferences. For example, the system may determine that the user has a health goal of losing weight. As such, the system may recommend the gas station farthest from a restaurant (or at least a restaurant that sells unhealthy food) and avoid the gas station located immediately next to the restaurant. As such, the system recommends a gas station to prevent the user from eating (if it is not a meal time) or from eating unhealthy food by reducing the temptation to the user based on the user's health goal and the distinguishing characteristics of the gas station.

In an embodiment, the system may monitor the user's behavior and transactions to determine whether the user's behavior and transactions are aligned with the user's goals. Further, the system may make recommendations to better help the user follow and achieve the user's goal. For example, the system may determine that the user is deviating from the health goal by visiting merchants selling greasy food. The system may recommend travel routes or merchants that are farther away from merchants that sell greasy food to help the user follow the user's health goal.

As such, the system determines secondary characteristics at or near similarly located merchants and provides a recommendation to a user for particular merchant based on secondary characteristics that are important to the user. Secondary characteristics include characteristics that are not the main service or type for a merchant. Using the gas station example, gas prices is a primary characteristic, and secondary characteristics may include free/charged air, bathroom cleanliness, types of food, drinks, and other items offered (or not offered) at the gas station, types of merchants adjacent to the gas station, free/charged car washes, etc.

FIG. 1 is a block diagram of a networked system 100 suitable for implementing a process for analyzing and leveraging distinguishing characteristics of merchants according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products or services from multiple merchants.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include various sensors and detection devices configured to detect environmental information at the user device 110. For example, the user device 110 may include a temperature sensor configured to detect a temperature at the user device 110, a light sensor configured to detect ambient light, a humidity sensor configured to detect humidity, an altitude sensor configured to detect altitude, a barometer configured to detect ambient pressure, a gyroscope and/or an accelerometer configured to detect orientation and movement, and the like. Thus, the user device 110 may detect various environmental changes and settings.

User device 110 also may include communication devices, such as a Bluetooth device, a Near Field Communication (NFC) interface, and the like. As such, the user device 110 may communicate with nearby devices that have detection devices. This allows the user device to gather additional detection data from other devices. For example, the user device 110 may communicate with the user's car console via Bluetooth to receive car conditions detected by various sensors in the user's car.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to charity or a deposit to a saving account. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

User accounts 180 also may store a user's goals or preferences. For example, the user 105 may have a health goal or a budget goal. User's purchase preferences may align with the user's health or budget goals. The payment provider server 170 may make merchant recommendations to the user 105 based on the user 105's goals or preferences. Preferences or goals may be based on user-defined or user-set preferences, user purchase history, user search history, user calendar (upcoming birthday, anniversary, etc.), user posts, and/or posts about the user. In some embodiment, the user accounts 180 may store products or services the user 105 is attempting to avoid. For example, the user 105 may have a health goal of quitting smoking. Thus, the user 105 may wish to avoid merchants that sell cigarettes or cigars. Goals and/or preferences are used to determine what may be of interest (or disinterest) to aid in determining whether a secondary characteristic of a merchant is more or less desirable than other similar merchants in the area.

In some embodiments, payment provider server 170 may maintain a merchant database including information related to merchants. For example, the merchant database may store basic merchant information, such as name, location, ownership, product/service offered, store hours, store size, target customers, merchant categories, competitors, and the like. The merchant database also may store unique or distinguishing characteristics of merchants, such as peripheral (or secondary) services or products offered, unique location, unique hours, nearby amenities and merchants, and the like. The merchant database may be accessed to recommend merchants to customers. The database may be populated based on merchant-provided information, information from publicly available sources, such as review sites and social networks, information provided to the payment provider by users, etc.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments. As such, transaction processing application 190 may store details of an order from individual users, including funding source used, credit options available, etc. Payment application 175 may be further configured to determine the existence of and to manage accounts for user 105, as well as create new accounts if necessary.

Figure 2:
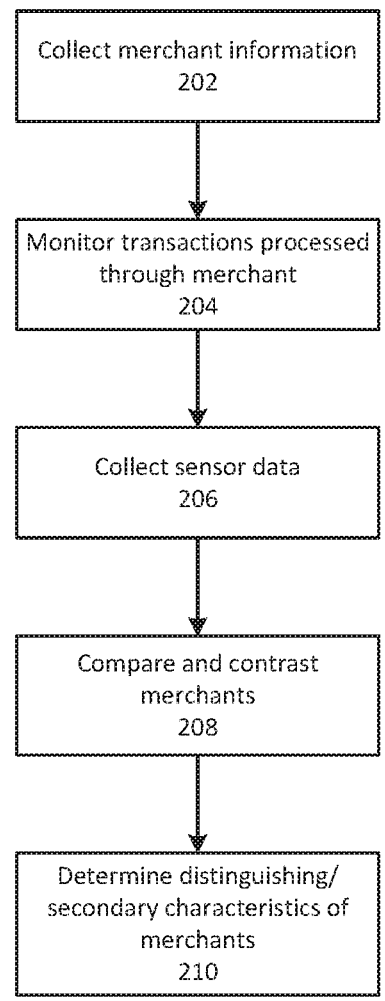
FIG. 2 is a flowchart showing a process of analyzing and determining distinguishing characteristics among merchants according to one embodiment.

FIG. 2 is a flowchart showing a process 200 of analyzing and determining distinguishing characteristics among merchants according to one embodiment. At step 202, the payment provider server 170 may collect merchant information from merchants. In some embodiments, merchants may set up merchant accounts at payment provider server 170 to receive payments from customers. Merchants may provide basic merchant information during merchant account setup. For example, merchants may provide name, ownership, address, phone number, email address, web address, store location(s), store size(s), types of payment accepted, products/services offered, and the like. In some embodiments, the payment provider server 170 may receive merchant information from third parties, such as directory services, or location services. Merchants may also provide information about nearby or adjacent merchants.

At step 204, the payment provider server 170 may monitor transactions processed through the merchants. In particular, the payment provider server 170 may process various transactions, such as payment transactions, purchase transactions, fund transfers, and other transactions for various merchants. The transactions may include various transaction information such as the merchant involved in the transaction, the customer/user involved in the transaction, time, date, location, transaction amount, items purchased (products or services), types or methods of payment, discounts applied, and the like. The payment provider server 170 may collect this transaction information and store them in a transaction database for later reference or analysis.

At step 206, the payment provider server 170 may collect sensor data from the user device 110 and/or the merchant server 140. The user device 110 may include various types of sensors that may detect and generate various types of sensor signals. For example, the user device 110 may include an audio sensor, a vibration sensor, an ambient light sensor, a location sensor (GPS), a Bluetooth Low Energy (BLE) indoor location sensor, a gyroscope/accelerometer motion sensor, a temperature sensor, an altitude sensor, a humidity sensor, and other sensors for detecting environmental factors. Thus, the user device 110 may detect various environmental factors or settings at or near merchants before, during, or after a transaction with a merchant. The sensor data may be communicated to the payment provider server 170 to provide context for the transaction.

In some embodiments, the user device 110 may be connected to other devices that have sensors. For example, the user device 110 may be connected to a wearable device of the user 105. The wearable device may include various types of sensors configured to detect the user 105's biometrics, such as heartbeat, body temperature, skin conductance, movement, and the like. The user device 110 may receive various sensor data form the wearable device and may communicate the sensor data to the payment provider server 170. The biometric sensor data may be used to determine the user 105's body condition and reactions related to transactions at a merchant.

In some embodiments, the user device 110 may be connected other devices, such as a car console installed in the user's car, entertainment console in the user's home, laptops, computers, merchant's devices, and the like. Sensor data generated by sensors in these other devices also may be gathered by the user device 110 and communicated to the payment provider server 170. For example, the user device 110 may receive sensor data related to car conditions from the user's car console. The car may include a rain sensor, an oil level sensor, a tire pressure sensor, an engine condition sensor, an engine temperature sensor, various fluid level sensors, various parts condition sensors, and the like. Sensor data from the car condition sensors may be used to determine any changes or repairs done to the car at a car mechanic, gas station, or other car related merchants.

At step 208, the payment provider server 170 may compare and contrast merchants. In particular, the payment provider server 170 may first organize merchants based on their basic information. For example, merchants who offer similar products and/or services may be grouped together. In another example, merchants who are located near each other may be grouped together. In still another example, merchants who target similar types or demographics of customers may be grouped together. In yet another example, merchants who have similar operation, size, franchise, and the like, may be grouped together.

As similar merchants are identified, the system may calculate similarity scores among merchants. The similarity score may indicate how similar one merchant is to another. For example, a higher similarity score may indicate that two merchants are very similar and have many similar parameters, such as location, types of product/services, and the like. The system may focus on one or more main factors, such as types of product/service offered and location, when comparing merchants by giving these factors greater weight in the similarity score calculation. As such, the system may identify competing merchants who are located in the same area and offer similar product/service. The system may select the competing merchants and attempt to determine distinguishing characteristics between them. For example, the system may identify gas stations located at the same intersection, apparel stores located in the same mall that target similar age and/or gender of customers, auto repair shops in the same neighborhood, restaurants on the same street, and the like.

At step 210, the system may determine distinguishing characteristics of merchants. As noted above in step 208, the system may select similar merchants, such as merchants that offer similar products/services, located near each other, and/or target similar customers, and may attempt to determine distinguishing characteristics among the similar merchants. The distinguishing characteristics may be hidden and may not be obviously known based on the merchant's basic information. In particular, the system may determine these hidden and distinguishing characteristics based on transaction data processed at the merchants, sensor data detected at the merchants, merchant provided information, publicly available information (such as from a scrape of various web sites), customer provided information (directly or indirectly through transactions), and the like.

The payment service provider may process transactions for the merchants and may utilize the transaction data to infer or determine distinguishing characteristics of merchants. In particular, the payment provider server 170 may compare and contrast transaction data processed at similar merchants to determine any differences or if any merchants have a unique trait or characteristic. For example, the payment provider server 170 may analyze transaction data from three gas stations, A, B, and C, that are located at the same intersection. The payment provider server 170 may determine that gas stations A and B include car repair charges on some of the customers' purchase transactions while gas station C never has car repair charges on customers' purchase transactions. This difference may indicate that gas station C does not offer car repair service.

The payment service provider also may determine distinguishing characteristics of merchants based on sensor data detected at the user device 110 or other devices connected to the user device 110. For example, the system may analyze transaction data of gas stations A, B, and C, and note that some of the customers who visited gas stations A and B paid for tire inflation service while customers who visited gas station C never pay for tire inflation service. Further, the system may analyze sensor data from the customers' user devices and cars and note that some of the customers who visited gas station C had their tire inflated based on the tire pressure sensor data detected by their cars' tire pressure sensors. As such, the system may determine that gas station C offers free pressurized air for tire inflation. Thus, free tire inflation may be a distinguishing characteristic of gas station C. If customers who visited gas station C are not detected as having their tire pressure changed, the system may determine that gas station C does not offer air services.

In another example, ambient noise sensors of user devices of customers may be used to detect ambient noise at merchants. For example, the ambient noise sensors of customers may pick up construction noise at a hotel. The system may determine that the hotel is under construction, which is a negative distinguishing characteristic of the hotel, albeit a temporary characteristic. When the construction noise no longer is detected by customers' devices, the system may determine that the hotel is newly renovated, which may be a positive distinguishing characteristic of the hotel.

In still another example, based on the transaction data and the rain sensor data from customers' cars, the system may determine that a car repair shop offers free car washes. In particular, the customers' transaction data do not show charges for car wash service, but the rain sensors on the customers' cars detected water drops during service at the car shop when weather conditions at the time showed no rain or moisture. The system may determine that the customers' cars are washed for free during service.

In yet another example, based on the location of the merchant and the location where the car is parked (as detected by a location detection device on the car), the system may determine whether the merchant has convenient parking for customers. Further, based on the movement of the customer's car and the movement/location of the customer at the merchant, the system may determine whether the merchant offers valet parking service, by which the merchant's personnel parks the car for the customer.

In some embodiments, the system may monitor transactions and movements of customers before and/or after the customers visit a particular merchant to determine other merchants or amenities located near or accessible from the particular merchant. For example, some customers who visited a gas station also visited a pizza shop immediately after the gas station, as indicated by the transaction data (purchase pizza immediately after purchasing gas) and the location/movement of the customers. The system may determine that the gas station may be located immediately near a pizza shop or that the pizza shop is located within the gas station. The system may determine that the nearby pizza shop is a distinguishing characteristic of the gas station.

In some embodiments, the system may note that, based on the volume and/or amount of transactions, one of the similar merchants is disproportionally popular or unpopular compared to the other similar merchants. The system also may detect a popular merchant based on the ambient noise detected inside a merchant's location, such as a noisy restaurant indicating popular and crowded restaurant. The system may analyze the transaction data, the sensor data, and other available information to determine certain distinguishing characteristics that cause a merchant to be more/less popular. For example, the system may analyze the movement and traffic patterns of customers who arrive and leave gas stations located at the same intersection. The system may determine that the popular gas station is located at a corner of an intersection that allows easier access for customers entering and exiting the gas station.

In another example, the system may analyze the biometric sensor data of customers who visited similar restaurants and may determine that more customers who visited a popular restaurant have biometric signatures of being in a pleasant state. The biometric signatures may include heartbeat, body temperature, skin conductance, and the like as detected by biometric sensors included in a wearable device of a customer. This may indicate that the restaurant offers good service and/or good food, including highly rated or popular food of a certain type, such as a particular restaurant having a really good hot dog or pizza. The system may also analyze communication from customers regarding the restaurant, such as pictures, comments, reviews, and other communication posted online, such as on social media networks, review sites, and the like. The system may determine distinguishing characteristics of the restaurant based on various information.

Thus, the process 200 may allow the system to collect information about the merchants from various sources including basic information provided by the merchants and/or customers (both directly and indirectly), transaction data, sensor data, location information, customer communication and the like, and may determine distinguishing characteristics of merchants. In particular, distinguishing characteristics among similar merchants may be determined to help customers select merchants. The distinguishing characteristics may be permanent or temporary which changes over time, such as seasonal or certain days of the week. The system may update the distinguishing characteristics over time to reflect the most up to date information.

Figure 3:
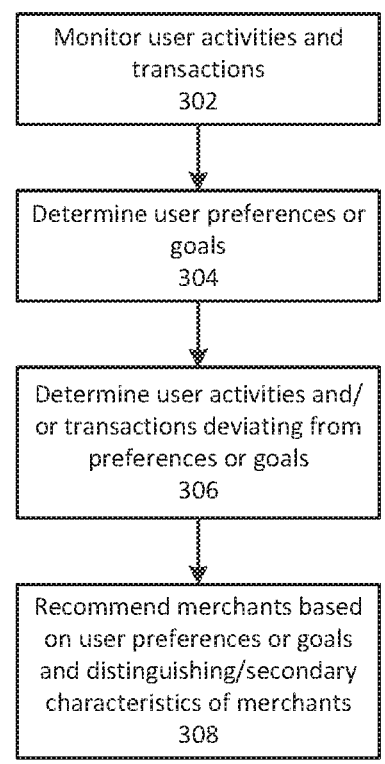
FIG. 3 is a flowchart showing a process for analyzing and suggesting merchants to users according to one embodiment.

FIG. 3 is a flowchart showing a process 300 for analyzing and suggesting merchants to users according to one embodiment. At step 302, the system may monitor user activities and transactions. The system may monitor user activities via user device 110. As noted above, the user device 110 may include sensors to detect user activities, such as location, movement, travel routes, transactions, biometric information, environmental factors, and the like. In particular, the system may collect user activities related to merchants, such as transactions made with merchants, visits at merchants' locations, sensor data detected at or near merchant's locations, and sensor data changes made at merchant's locations. The collected user activities may be analyzed to determine the user 105's activities at merchants, such as what transactions took place, what products/services received, and other activities. For example, when the user 105's car is serviced at a repair shop, the various sensors in the user 105's car may detect changes to the car condition. Sensor data from the user 105's car may be communicated from the car console to the system. Thus, the system may determine what services were performed on the car based on the sensor data. The system also may determine what services were paid for at the repair shop based on the user 105's transaction data at the repair shop.

At step 304, the system may determine user preferences or goals. In an embodiment, the user 105 may provide or input user 105's goals of preferences. For example, the user 105 may have a health goal, such as a target weight loss, training for a marathon, or the like. In another example, the user 105 may have a financial goal, such as saving a certain amount of money. In still another example, the user 105 may have a work or school related goal for certain achievements or targets. In some embodiments, the system may determine the user 105's goals based on the user 105's activities, as noted in step 302.

In some embodiments, the system may determine the user 105's current preferences based on the time, location, and environment. For example, if it is meal time, a preference may be a restaurant or a specific type of restaurant based on the user's food preferences. In another example, if the user's car is detected as being dirty or the user has a date the next night, a preference may be a car wash. Thus, the system may analyze the environmental conditions, user 105's to-do list, schedule, calendar, time, location, season, and the like to the user 105's current preference. For example, if there are three nearby gas stations, and the user 105 needs gas and all three gas stations are about the same price, secondary factors based on user preferences may be used to suggest one of the gas stations to the user. In particular, the importance of the secondary factor is based on what the user 105 may currently want (eating healthy, buying a gift, getting air in tire, getting a car wash, a clean restroom (maybe a user who has been on the road for a long time), buying cigarettes, etc.

In some embodiments, the system may help the user 105 follow a long term goal when the user 105's current preference does not align with the user 105's long term goal. For example, the user 105 may have a current preference of buying fast food when the user 105 is near a food court, but the user 105 may have a long term goal of no-fast food diet. Thus, the system may help the user 105 avoid buying fast food by directing the user 105 away from the food court or by recommending alternative healthy food places to the user 105.

At step 306, the system may determine user activities and/or transactions deviating from preferences or goals. In particular, the system may analyze user activities that do not match the user 105's goals or preferences. For example, the system may determine that the user 105 visited a pizza shop and purchased a slice of pizza. However, the user 105 currently has a no-pizza diet plan. As such, the system may determine that the user 105 is deviating or violating the user 105's goal or preference.

In some embodiments, the system may attempt to determine a reason for the user 105's deviation from the goals or preferences. For example, the user 105 may have purchased the pizza because the user 105 was getting gas at a nearby gas station and was enticed by the pizza shop located next to the gas station. Thus, the system may analyze transaction data, sensor data, and other user activities of the user 105 to determine the cause or reason for the deviation or violation.

In some embodiments, the system may learn or determine the user 105's tendencies and self-control with respect to different items the user 105 should avoid based on the goals or preferences. The system may calculate a trust score relating to these items that the user 105 should avoid. A higher trust score for an item means that the user 105 has no problem with the item and has high probability of success in resisting the item. On the other hand, a lower trust score for an item may indicate that the user 105 has low probability of success in resisting the item. The trust score may be calculated based on the user 105 activities in view of a purchase opportunity presented to the user 105. For example, the system may determine that the user 105 has been presented many opportunities to purchase a prohibited item, but the user 105 did not purchased the prohibited item. Thus, the system may calculate a higher trust score for the user 105 with respect to the prohibited item. In an embodiment, the trust score may be determined based on the user 105's transaction data, such as the frequency of prohibited items purchased, the last time prohibited items were purchased, and the like.

At step 308, the system may recommend merchants based on user preferences or goals and distinguishing characteristics of merchants. Based on the reasons or causes of the user 105's deviation or violation of the user 105's goals or preferences, the system may recommend merchants, routes, and/or schedules to help the user 105 keep the user 105's goals or preferences. Further, the recommendations may also be made in view of the distinguishing characteristics of merchants. For example, the system may determine that the user 105 is easily enticed to purchase a pizza if the user 105 is near a pizza shop based on the trust scores. Thus, the system may avoid merchants that are near pizza shops. Further, the system may recommend travel routes and/or schedules that avoid pizza shops.

In an embodiment, the system may include health goal service which is configured to analyze and determine health goals of the user. As such, the user 105's health goals, health rules, and/or preferences may be taken into consideration along with distinguishing characteristics of merchants for merchant recommendations. For example, the user may be on a particular type of diet, such as a low fat diet, or the user may be allergic to gluten or wheat. The system may digitally harvest menus from food merchants and/or customer transaction data to determine merchants that should be avoided by the user. The health goal service may filter out merchants that should be avoided by the user based on the user's goals or preferences. If the health goal service clears a merchant, then the system may recommend that merchant to the user.

The health goal service may assign scores to potential merchants based on the health goals of the user in view of the distinguishing characteristics of the merchants. For example, a pizza shop that offers good salads may receive a higher score than pizza shops that do not offer healthy alternatives. This allows users to make judgment calls in situations where there is not best choice, but only the least bad choice when pizza shops are the only available food options. The health goal service and the system may monitor user behavior when a place that is not recommended is visited by the user, such as a pizza shop with salads when the user is on a diet. If the user's transaction data indicates that the user ends up purchasing items or services that are restricted by the health goal service, the system may determine that the user is violating the health goals. As such, the system and the health goal service may become stricter for successive recommendations (avoiding all places that offer restricted items), because the user is not able to resist the restricted items when they are presented to them.

In an embodiment, the health goal service also may data mine calorie counts from merchants' food menus, such as via public API service calls. For example, restaurants, food chains, and other food merchants may post calorie counts of the items they offer online. The system and/or the health goal service may compare calorie counts of different food items to determine the relative health benefit of the food items. For example, if a salad actually has more calories than a slice of pizza, then the user's choice to purchase a slice of pizza instead of a salad may not count against the user. In some embodiments, the health goal service may take into account the portion and size of food items purchased by the user. Portion and size information may be determined from user's transaction data, such as large or small fries. Thus, the health goal service may consider portion and size as factors in making recommendations for the user. Further, portion control based on transaction data or transaction history may be used to determine if the user has met his or her health goal. If the user has met the health goal, the event may be fed back into the system for the user for future recommendations. Thus, the system may learn the user's habits and tendencies over time. In some embodiments, the system may make similar recommendations for similar users or users who have similar health goals. As such, the system may crowd source health goal recommendations and results from the crowd to make recommendations for a particular user.

Thus, a service provider may provide one or more recommended merchants to a user that satisfies both a primary purpose of the user visiting the merchant and secondary reasons (based on preferences and/or goals, which can be based on habit, history, user-defined information, current conditions, etc.). For example, if multiple merchants offer the same primary service/products and are located near each other (or along a route of the user), the user may not know which one to visit, especially if the primary service/products have similar pricing. In that case, secondary factors/considerations of the merchants may be taken into account so that the user is recommended one or more merchants offering a secondary factor/consideration that is desirable to the user, which allows a system to provide an informed recommendation that is beneficial to the user.

The above processes 200 and 300 may be executed by user device 110. In some embodiments, the processes 200 and 300 may be executed at merchant device 140 or payment provider server 170. In some other embodiments, above processes 200 and 300 may be executed by one or more of user device 110, merchant device 140, and payment provider server 170 in coordination with each other. Note that the various steps and processes described herein may be omitted, combined, and/or performed in a different sequence as desired.

Figure 4:
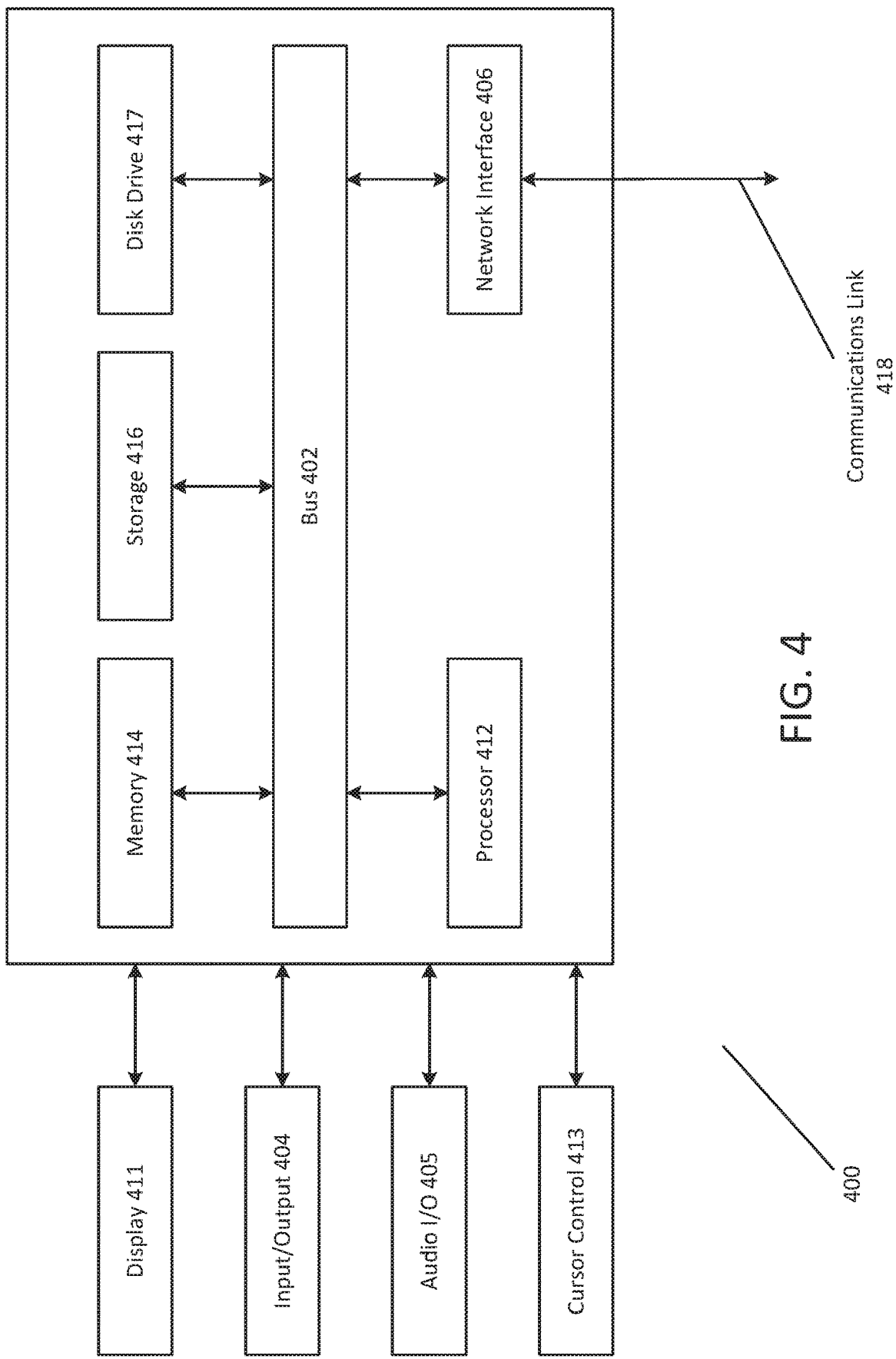
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing merchant information; and
one or more hardware processors coupled to the non-transitory memory and configured to read instructions from the non-transitory memory to cause the system to perform operations comprising:
determining a location of a user;
determining a plurality of merchants offering services or products of a particular type within a predetermined distance from the location of the user;
receiving sensor data detected by user devices of users visiting the plurality of merchants, wherein the sensor data comprises biometric data detected from the users via wearable devices of the users, and wherein the biometric data comprises one or more of a body temperature, a heart rate, a skin conductance, or a body movement;
determining secondary characteristics of the plurality of merchants based on the received sensor data;
determining one or more preferences of the user; and
communicating a recommendation of a subset of the plurality of merchants to the user based on the one or more preferences of the user and the secondary characteristics of the plurality of merchants.

2. The system of claim 1, wherein the secondary characteristics are secondary services or products offered by one or more of the plurality of merchants.

3. The system of claim 1, wherein the secondary characteristics are other merchants located within a second predetermined distance from one or more of the plurality of merchants.

4. The system of claim 1, wherein the operations further comprise collecting transaction data processed at the plurality of merchants, and wherein the secondary characteristics of the plurality of merchants are determined further based on the transaction data.

5. The system of claim 1, wherein the plurality of merchants are determined based on one or more of a location, a product or service offered, a business type, a store size, or a type of customers.

6. The system of claim 1, wherein the sensor data further comprises one or more of environmental data detected at a location of the merchant and device conditions associated with at least one of the user devices of the users.

7. The system of claim 6, wherein the environmental data comprises one or more of a temperature, an atmosphere pressure, a humidity, an altitude, an ambient light level, or an ambient noise level.

8. The system of claim 6, wherein the device conditions comprise one or more of a tire pressure, a rain sensor, an engine condition, a gasoline level, or a fluid level.

9. A method comprising:
determining, by one or more processors, a location of a user;
determining, by the one or more processors, a plurality of merchants offering services or products of a particular type within a distance threshold from the location of the user;
receiving, by the one or more processors, sensor data detected by user devices of users visiting the plurality of merchants, wherein the sensor data comprises biometric data detected from the users via wearable devices of the users, and wherein the biometric data comprises one or more of a body temperature, a heart rate, a skin conductance, or a body movement;
determining, by the one or more processors, secondary characteristics of the plurality of merchants on the received sensor data;
determining, by the one or more processors, one or more preferences of the user; and
communicating, by the one or more processors, a recommendation of a subset of the plurality of merchants to the user based on the one or more preferences of the user and the secondary characteristics of the plurality of merchants.

10. The method of claim 9, further comprising collecting transaction data processed at the plurality of merchants, and wherein the secondary characteristics of the plurality of merchants are determined further based on the transaction data.

11. The method of claim 9, wherein the one or more preferences of the user comprise one or more long term goals.

12. The method of claim 11, wherein the one or more long term goals comprise one or more of a health goal or a financial goal.

13. The method of claim 11, further comprising:
monitoring user transactions conducted at the plurality of merchants;
determining one or more user transactions from the user transactions that are deviating from the one or more long term goals of the user; and
communicating, to a device of the user for display, recommendations of merchants that re-align the one or more user transactions with the long term goals of the user.

14. The method of claim 11, wherein the one or more preferences of the user further comprise one or more current preferences.

15. The method of claim 14, further comprising recommending merchants based on the one or more current preferences of the user.

16. The method of claim 15, further comprising communicating, to a device of the user for display, recommendations of merchants that avoid the one or more current preferences of the user when the one or more current preferences of the user are contrary to the one or more long term goals of the user.

17. A non-transitory machine-readable medium comprising a plurality of machine-readable instructions which when executed by one or more processors are adapted to cause the one or more processors to perform a method comprising:
determining a location of a user;
determining a plurality of merchants offering services or products of a particular type within a predetermined distance from the location of the user;
receiving sensor data detected by user devices of users visiting the plurality of merchants, wherein the sensor data comprises biometric data detected from the users via wearable devices of the users, and wherein the biometric data comprises one or more of a body temperature, a heart rate, a skin conductance, or a body movement;
determining secondary characteristics of the plurality of merchants based on the received sensor data;
determining one or more preferences of the user; and
communicating a recommendation of a subset of the plurality of merchants to the user based on the one or more preferences of the user and the secondary characteristics of the plurality of merchants.

18. The non-transitory machine-readable medium of claim 17, wherein the method further comprises collecting transaction data processed at the plurality of merchants, and wherein the secondary characteristics of the plurality of merchants are determined further based on the transaction data.

19. The non-transitory machine-readable medium of claim 17, wherein the sensor data further comprises one or more of environmental data detected at a location of the merchant and device conditions associated with at least one of the user devices of the user, and wherein the environmental data comprises one or more of a temperature, an atmosphere pressure, a humidity, an altitude, an ambient light level, or an ambient noise level.

20. The non-transitory machine-readable medium of claim 19, wherein the device conditions comprise one or more of a tire pressure, a rain sensor, an engine condition, a gasoline level, or a fluid level.

\* \* \* \* \*